United States Patent [19]

Jurgich

[11] Patent Number: 4,632,347

[45] Date of Patent: Dec. 30, 1986

[54] HOLDER FOR KITCHEN UTENSILS AND COMPLEMENTING STAND

[76] Inventor: Donald Jurgich, P.O. Box 1575, Poulsbo, Wash. 98370

[21] Appl. No.: 730,762

[22] Filed: May 3, 1985

[51] Int. Cl.⁴ .............................................. F16B 5/12
[52] U.S. Cl. ................................ 248/213.2; 211/70.6; 24/570
[58] Field of Search ................. 248/213.2, 309.1, 314, 248/111; 211/70.6; 24/531, 457, 335, 570

[56] References Cited

U.S. PATENT DOCUMENTS 1,237,504  8/1917  Graham ........................ 248/213.2 X
1,321,048 11/1919  Johnson ........................ 248/213.2 X
1,928,995 10/1933  DeBiasi ........................ 248/213.2 X

*Primary Examiner*—Ramon S. Britts
*Assistant Examiner*—Blair M. Johnson
*Attorney, Agent, or Firm*—Seed and Berry

[57] ABSTRACT

A holder body has a central set of channels to selectively receive the handle of a spoon or other cooking utensil and has two end sets of channels to selectively fit over the rim of a container. The channels in each set are of different widths. A stand is provided on which the holder body may be placed. This stand also is adapted to hold utensil handles.

8 Claims, 9 Drawing Figures

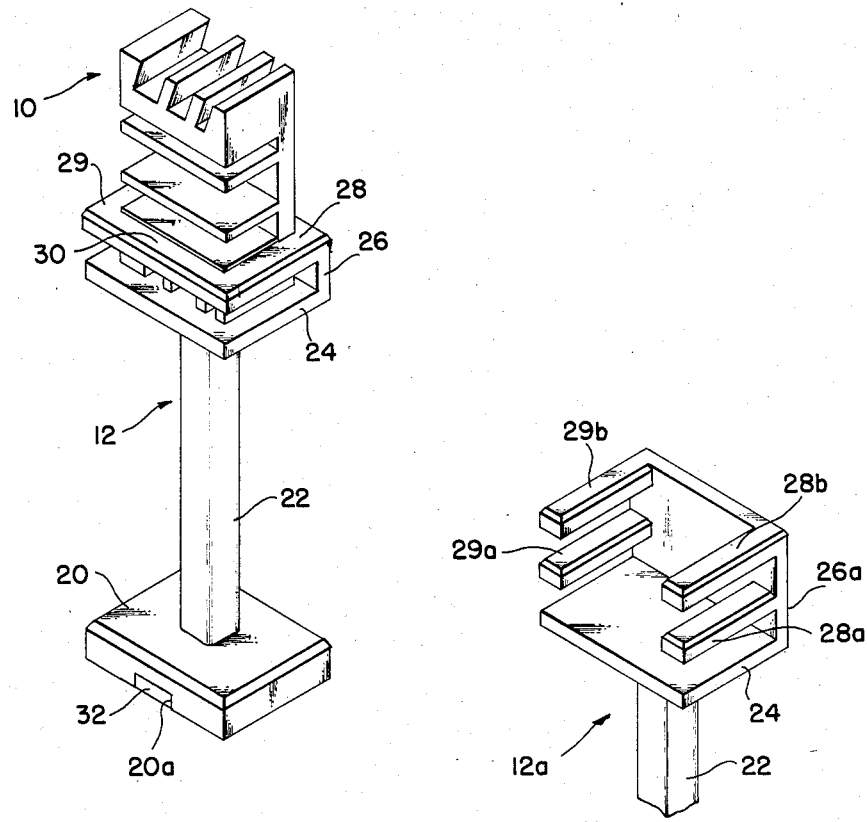
FIG. 7
FIG. 9
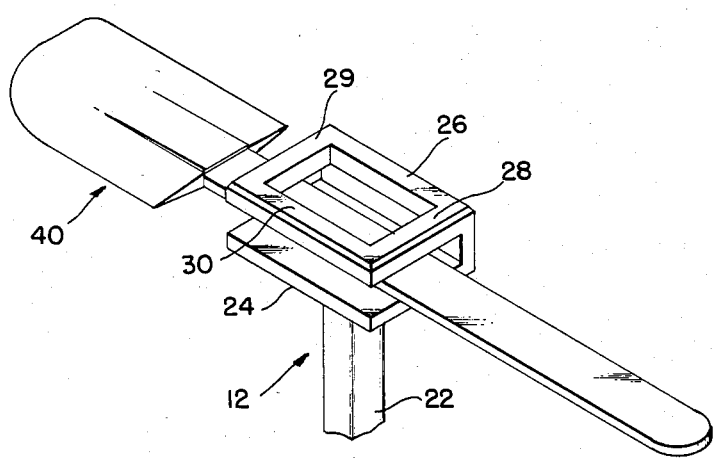
FIG. 8

HOLDER FOR KITCHEN UTENSILS AND COMPLEMENTING STAND

TECHNICAL FIELD

The present invention relates to a holder for receiving the handle of a kitchen utensil, such as a spoon, whisk, beater, fork, scraper or spatula, and holding it such that the working part of the utensil overhangs a pan, bowl or other container containing comestibles to be stirred, beat or otherwise worked by the utensil.

DISCLOSURE OF INVENTION

Commonly in preparing a sauce, batter, gravy, filling or the like, a cook will from time to time work the ingredients with a suitable utensil and not have a convenient place to set the utensil down between operations without dripping or smearing food being prepared onto a kitchen counter or stove top from the utensil. The present invention aims to provide a simple device for holding such utensils so that they will drip into the container holding the comestible to be stirred or otherwise worked by the utensil. In carrying out this objective, the invention also aims to provide such a device which is durable, inexpensive to produce, easy to clean and does not have any working parts.

A further object is to provide a stand for the basic holder which can be used to locate the holding device in operative position and can also serve as a utensil holder when not carrying the holding device.

The holding device of the invention is a one-piece unit which is adapted to fit over the upper rim of a pan, bowl or other kitchen container and provide one or more channels to receive and support a utensil handle such that the working part of the utensil will extend over the container. To receive the container rim, the basic holder has sets of slots of various widths and slopes.

Complementing the holding device is a portable stand having a platform for receiving the device. This stand also has one or more pairs of arms spaced above the platform to define handle-receiving channels for use when the holding device is not on the platform. The base of the stand has a magnet to hold the stand in selected position on a stove top.

BRIEF DESCRIPTION OF THE DRAWINGS

In the accompanying drawings:

FIG. 7 is an isometric view of a complementing stand comprising part of the invention and shown carrying the holder;

FIG. 8 is a fragmentary isometric view of the stand shown holding a spatula; and FIG. 9 is a fragmentary isometric view of a modified stand.

BEST MODE FOR CARRYING OUT THE INVENTION

Figure 1:
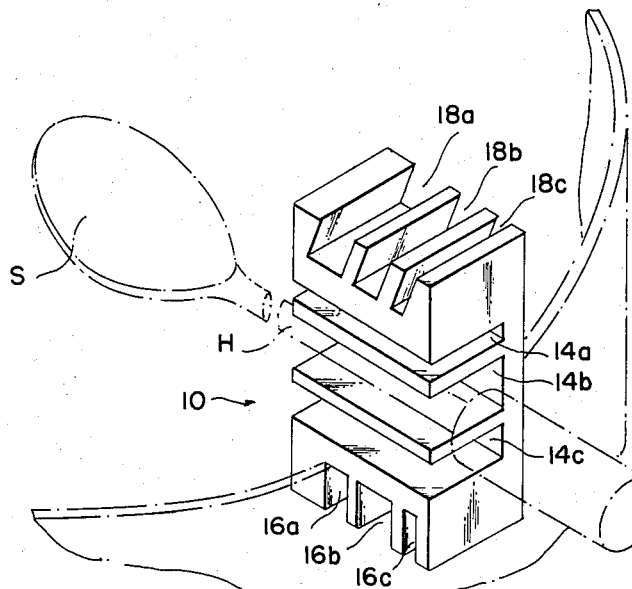
FIG. 1 is an isometric view of a holder embodying the present invention shown in operative position mounted on a container and holding a spoon, the container and spoon being shown in phantom.
Figure 2:
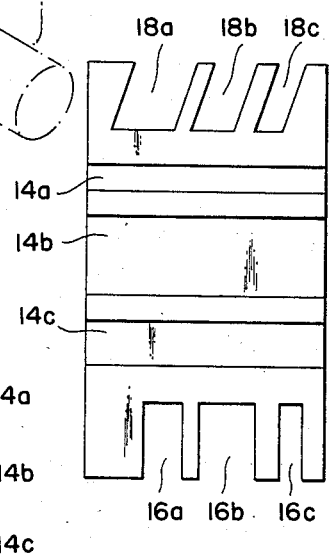
FIG. 2 is a front elevational view of the holder.
Figure 4:
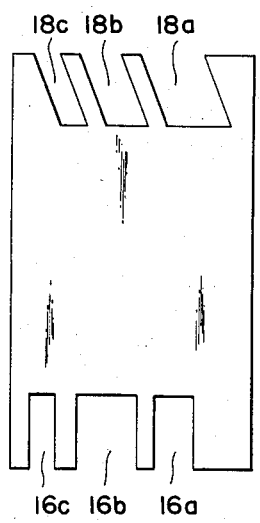
FIG. 4 is a back elevational view of the holder.
Figure 3:
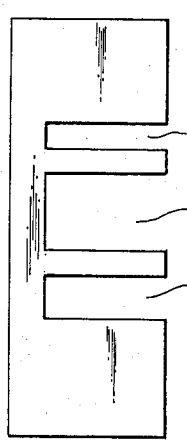
FIG. 3 is a side elevational view of the holder.
Figure 5:
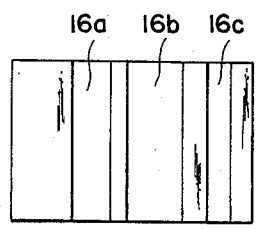
FIG. 5 is a bottom plan view of the holder.
Figure 6:
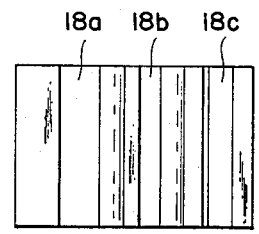
FIG. 6 is a top plan view of the holder.

Referring to the drawings, the invention comprises a holder block 10 and a mating stand unit 12, both adapted to function independently when separated to hold a cooking utensil handle. The holder block 10 is preferably in the shape of a rectangular parallelepiped and is formed with three sets of channels, namely, a central set 14 and two parallel end sets 16 and 18 located at opposite ends of the block and extending with their length generally at right angles to the length of the central set.

For purposes of example, each of the three sets has three channels (marked with the suffixes a, b and c) and the three channels in each set are purposely of different widths. The end channels 16 extend at right angles relative to the central channels 14, whereas the other end channels 18 purposely slope relative to the central channels 14.

As shown in FIG. 1, the function of the end channels 16 is to fit over the rim of a container C to position the central channels 14 radially of the container. If the container wall is sloped, the holder block 10 is reversed and one of the sloped channels 18 preferably is used to fit the holder body over the rim of the container.

When the holder block is fitted over the container rim, a utensil handle can be positioned within an appropriately thick one of the central channels 14. For example, in FIG. 1, a spoon handle H is shown fitted into the center one of the three central channels 14 with the working portion S of the spoon overhanging the container. It will be apparent that the spoon can be readily removed from the holder for use and then replaced after use so as to drip ingredients back into the container which were acquired by the spoon while used to stir the ingredients.

Normally the spoon handle H will not fit snugly within one of the central channels 14, but will tilt slightly downward within the channel such that a forward end portion of the handle engages the bottom wall of the channel at the inner end thereof (i.e., the end closest to the inside of the container), and a rearward end portion of the handle engages the upper wall of the channel at the outer end thereof. Since an end channel 16 can be selected to receive the container rim such as to position the central channels 14 in a generally horizontal position, a utensil handle loosely fitting within one of the central channels and engaging the bottom and upper walls thereof in the manner above described, will not slide out of the central channel even though tilted a few degrees from the horizontal downwardly toward the bottom of the container.

Referring to FIGS. 7 and 8, it is seen that the stand unit 12 has a base 20, a column 22 on the base 20 and a platform 24 on the column 22. A back wall 26 extends upwardly from the platform, and projecting forwardly from this back wall are a pair of parallel arms 28-19. These arms may be interconnected at the front by a cross-member 30. The base 20 has a slot 20a along the underside to receive a bar magnet 32. As shown in FIG. 7, the back 26, arms 28-29 and cross-member 30 define a rectangular opening at the top which is sized to receive the holder block 10 when the holder block is on end. Also, the top face of the arms 28-29 are spaced above the platform 24 no more than the distance from the lowermost channel 14 to the adjacent end of the holder block. In this regard, the distance from the channel 14a to the adjacent end of the channel block is preferably the same as the distance from the channel 14c to the respective adjacent end of the holder block. By this arrangement, when the holder block 10 is mounted on the stand 12, the channels 14 are exposed to be used to hold utensils if desired. Then, the stand with the holder block thereon can be placed, for example, alongside a cooking container of appropriate height on a stove and the holding block 10 will function to position the working portion of the utensil over the container as shown in FIG. 1, but without the holder block being mounted on the rim of the container. The magnet 32 on the base of the stand 12 by its attraction to the ferrous metal top of the stove will retain the stand in upright position, offsetting the load of the cooking utensil which projects over the container from the holder block 10.

As indicated in FIG. 8, with a spatula 40 being shown held for purposes of example, the stand 12 can also be used independently of the holder block 10 as a holder and placed beside a container as previously described. In this example, the arms 28-29 jointly with the platform define a channel to receive the handle of the spatula 40. FIG. 9 illustrates a modified stand 12a in which the back wall is made taller to support another tier of arms 28b-29b above arms 28a-29a. With this modified arrangement, the arms 28a-29a jointly define a second channel with the arms 28b-29b to receive a utensil handle. This second channel may be given a different vertical width than that of the channel defined by the arms 28a-29a and the platform 24 to accommodate a different handle size.

When the holder block 10 and stand 12 are not in use, they can be conveniently stored in the nested position shown in FIG. 7.

It will be appreciated that, although specific embodiments of the invention have been described herein for purposes of illustration, various modifications may be made without departing from the spirit and scope of the invention. Accordingly, the invention is not limited except by the appended claims.

I claim:

1. A device for holding the handle of a cooking utensil such as a spoon or whisk, comprising:

a holder body having a central set of channels and two end sets of channels, the channels of one of the end sets being sloped relative to the other end set and the channels of both end sets extending crosswise of the holder body relative to the channels of the central set, each channel of the three sets being exposed at its ends and along one side and having a different width than each other channel in the same set; and the channels in the central set being located between the end sets and being adapted to selectively receive the handle of a utensil, and the channels in the end sets being adapted to selectively fit over the rim of a container with the utensil projecting over the container from the central set.

2. A device according to claim 1 in which each channel in said central set and two end sets is straight.

3. A device for holding the handle of a cooking utensil such as a spoon or whisk, comprising:

a holder body having a first set of parallel exposed channels of different widths, each adapted to receive the handle of a utensil; and said holder body having a second set of parallel exposed channels of widths different from one another extending crosswise of the holder body relative to the channels of the first set and each adapted to fit over the rim of a container with the utensil projecting over the container from the first set of channels.

4. A device according to claim 3 in which each channel in said first and second sets is straight.

5. A device for holding the handle of a cooking utensil such as a spoon or whisk, comprising:

a holder body having two opposite ends, each formed with an open slot, the slot at one end being sloped relative to the slot at the other end, said holder body also being formed with a plurality of elongated side slots located between said end slots and extending crosswise of the holder body relative to the end slots; and the side slot being adapted to receive the handle of a utensil and the end slots being adapted to selectively receive the rim of a container with the utensil projecting from the side slot over the container.

6. A device according to claim 13 in which the side slots have widths different from one another, extend parallel to one another and are capable of receiving a variety of utensil handle sizes.

7. A device according to claim 5 in which the holder body is formed with multiple additional end slots at each end of widths different from one another extending parallel to respective of said end slots for receiving a variety of container rim thicknesses.

8. A device according to claim 5 in which each of said slots is straight.

* * * * *